(12) United States Patent
Yao

(10) Patent No.: US 7,453,591 B2
(45) Date of Patent: Nov. 18, 2008

(54) COLOR SATURATION ADJUSTMENT

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 1060 days.

(21) Appl. No.: 10/620,047

(22) Filed: Jul. 14, 2003

(65) Prior Publication Data

US 2005/0012943 A1  Jan. 20, 2005

(51) Int. Cl.
*G06K 15/00* (2006.01)
*G06F 1/00* (2006.01)

(52) U.S. Cl. .............. 358/1.15; 358/523; 358/525; 382/168; 382/162

(58) Field of Classification Search ............... 358/1.15, 358/516, 525, 518, 461, 520, 2.1; 382/167, 382/162

See application file for complete search history.

(56) References Cited

U.S. PATENT DOCUMENTS

| | | | |
|---|---|---|---|
| 4,482,917 A | | 11/1984 | Gaulke et al. |
| 5,231,504 A | * | 7/1993 | Magee ...................... 358/500 |
| 5,710,824 A | * | 1/1998 | Mongeon ................... 382/162 |
| 6,191,874 B1 | * | 2/2001 | Yamada et al. .............. 358/529 |
| 7,085,008 B2 | * | 8/2006 | Weldy ........................ 358/1.9 |
| 7,085,009 B2 | * | 8/2006 | Kawai et al. ................. 358/1.9 |
| 7,102,669 B2 | * | 9/2006 | Skow ....................... 348/222.1 |
| 7,148,997 B2 | * | 12/2006 | Kawai et al. ................. 358/1.9 |
| 7,173,732 B2 | * | 2/2007 | Matama ...................... 358/1.9 |
| 7,176,935 B2 | * | 2/2007 | Higgins ..................... 345/589 |
| 7,177,469 B2 | * | 2/2007 | Kagawa et al. .............. 382/167 |

FOREIGN PATENT DOCUMENTS

| | | |
|---|---|---|
| EP | 0 685 962 A2 | 12/1995 |
| WO | WO 96/08913 | 3/1996 |

OTHER PUBLICATIONS

Meng Yao, U.S. Appl. No. 10/270,966, filed Oct. 15, 2002.
Meng Yao et al., U.S. Appl. No. 10/270,992, filed Oct. 15, 2002.

* cited by examiner

*Primary Examiner*—Edward L. Coles
*Assistant Examiner*—Negussie Worku
(74) *Attorney, Agent, or Firm*—Fay Sharpe LLP

(57) ABSTRACT

A method of gray balance adjustment and color saturation adjustment including generating respective gray balancing components for initial primary color data values, generating respective color saturation adjustment components for the initial primary color data values, and adding respective gray balancing components and respective color saturation adjustment components to produce respective gray balanced and color saturation adjusted primary color data values.

6 Claims, 4 Drawing Sheets

$$C = GRAYBAL\_C(C)*RATIO + SAT\_C(C)*(1-RATIO)$$
$$M = GRAYBAL\_M(M)*RATIO + SAT\_M(M)*(1-RATIO)$$
$$Y = GRAYBAL\_M(M)*RATIO + SAT\_Y(Y)*(1-RATIO)$$

319'

COLOR SATURATION ADJUSTMENT

BACKGROUND OF THE DISCLOSURE

The subject disclosure is generally directed to adjusting color saturation.

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks.

For certain images, especially graphics, it may be desirable to adjust color saturation so that the printed outputs are more vivid.

DETAILED DESCRIPTION OF THE DISCLOSURE

Figure 1:
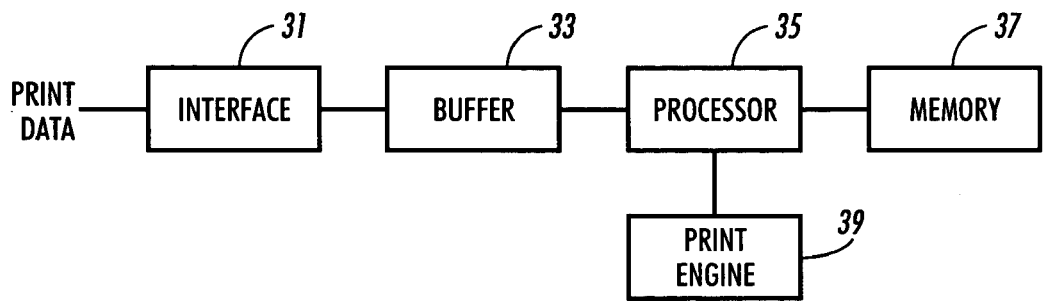
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

Figure 2:
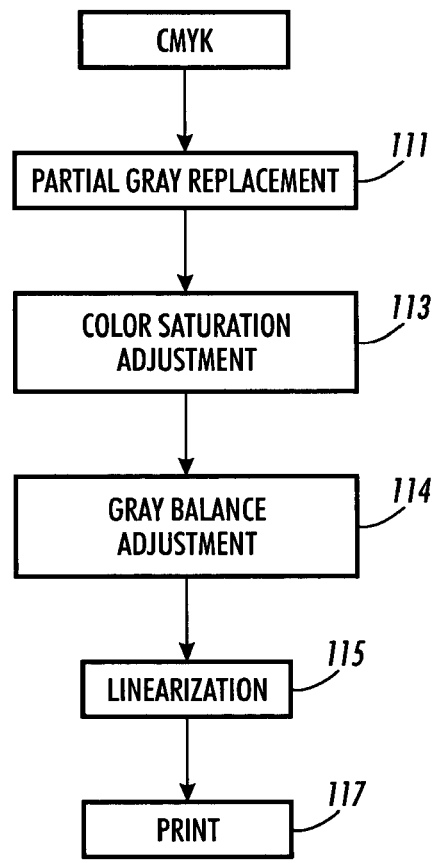
FIG. 2 is a schematic diagram of an embodiment of an image processing pipeline.

FIG. 2 is a block diagram of an embodiment of a portion of an image processing pipeline for a color printer. At 111 partial gray replacement is performed on input primary color data such as CMYK (cyan, magenta, yellow, black), wherein some amounts of CMY are replaced with black. At 113 color saturation adjustment is performed, and at 114 gray balance adjustment is performed. Alternatively, gray balance adjustment can be performed prior to color saturation adjustment. At 115 linearization is performed so that substantially equal changes in C, M or Y tends to produce substantially equal changes in visual perception, for example. At 117 half-toning is performed, and at 117 printing takes place.

Figure 3:
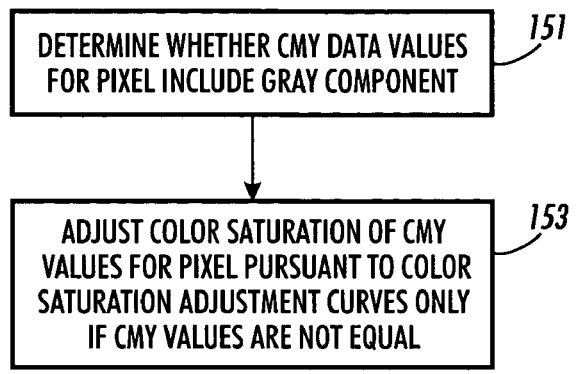
FIG. 3 is a schematic flow diagram of an embodiment of a color saturation adjustment procedure.

FIG. 3 is a schematic flow diagram of an embodiment of a procedure for color saturation adjustment of non-black color data such as input CMY data for a pixel of an image or gray balanced CMY data, and can be employed to adjust the color saturation or intensity of some or all of the pixels of an image, as desired.

At 151 a determination is made as to whether the CMY data values for a pixel include a gray component. The CMY data values for a pixel contain a gray component if all of the CMY data values for a pixel are non-zero. The gray component can comprise for example the minimum of the C, M and Y data values. At 153 the CMY data values for a pixel are color saturation adjusted pursuant to color saturation curves only if the C, M and Y data values are not equal (i.e., non-gray and not equal to zero).

Figure 4:
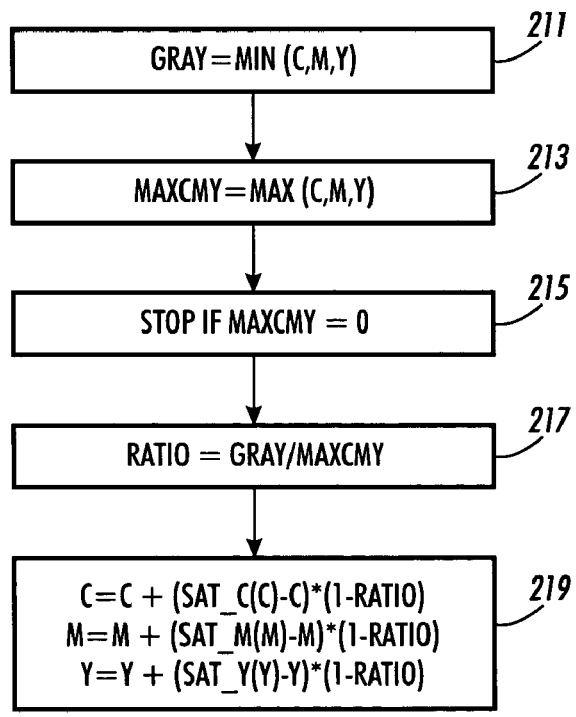
FIG. 4 is a schematic flow diagram of an embodiment of another color saturation adjustment procedure.

FIG. 4 is a schematic flow diagram of an embodiment of a procedure for color saturation adjusting non-black primary color data such as CMY data for a pixel of an image, and can be employed to adjust the color saturation of non-gray balanced CMY data, for example.

At 211 a GRAY component is set to the minimum of the initial C, M and Y data values for a pixel. At 213 MAXCMY is set to the maximum of the initial C, M and Y data values for a pixel. At 215 the procedure is stopped if the maximum MAXCMY of the initial C, M and Y values is zero (i.e., if all of the C, M and Y values are zero), and the CMY data values for this pixel are not adjusted. At 217 a RATIO of the GRAY component to MAXCMY is calculated. At 219 saturation adjusted CMY data values are calculated by adding to each of the initial CMY values a product of: (1) the difference between a corresponding maximum saturation adjusted value SAT_C(C), SAT_M(M), or SAT_Y(Y), and the initial C, M or Y value, and (2) one minus the RATIO calculated previously. The maximum saturation adjusted values SAT_C(C), SAT_M(M) and SAT_Y(Y) are what the saturation adjusted CMY values would be set to if there is no gray component, and can be obtained from saturation curves that can be implemented as a look-up table that is indexed by the initial C, M and Y data values, for example. As discussed further herein, the difference between the maximum saturation adjusted value for a particular initial C, M or Y data value and such initial C, M or Y data value is scaled depending on the amount of chroma or non-gray in the initial C, M or Y data value. Each saturation curve can for example be a sigmoid function wherein color is reduced for lighter colors and is increased for darker colors. For example, the saturation curve values are less than the initial color values for lighter colors, and are greater than the initial color values for darker colors. By way of illustrative example, the same saturation curve can be used for all non-black primary colors.

In the foregoing, since RATIO is GRAY/MAXCMY, RATIO can be considered as defining the relative amount of gray in the initial CMY data values. (1−RATIO) can be expressed as (MAXCMY−GRAY)/MAXCMY, and thus can be considered as defining the relative amount of chroma or non-gray in the initial CMY data values. (MAXCMY−GRAY) can be considered as a chroma component of the initial CMY data values. RATIO can also be conveniently considered as a relative gray component while (1-RATIO) can be conveniently considered as a relative non-gray or chroma component. Since (1−RATIO) increases with the relative amount of chroma in the initial CMY data, and since (SAT_C(C)−C), (SAT_M(M)−M) and (SAT_Y(Y)−Y) represent the differences between the maximum saturation adjusted values and the respective initial color data values, the amount of saturation adjustment for the initial CMY data values increases with the relative amount of chroma that is contained in the initial CMY data. In other words, the amount of saturation adjustment is a function of the relative amount of chroma (1-RATIO) in the initial CMY data. Thus, for data without a gray component (i.e., at least one of the initial C, M and Y values is zero), RATIO is equal to zero, (1-RATIO) is 1, and maximum saturation adjustment is performed. For gray colors (i.e., the initial C, M and Y values are equal and there is no chroma), RATIO is 1, (1-RATIO) is zero, and no saturation adjustment is performed.

More generally, the amount of saturation adjustment can be a linear or non-linear function of the relative amount of chroma in the initial CMY data, wherein maximum saturation adjustment is performed for data without a gray component and where no saturation adjustment is performed for gray colors. For example, RATIO can be a linear or non-linear function of the relative amount of gray in the initial CMY data, and is equal to 1 for gray colors and is equal to 0 for data without a gray component. Similarly, (1-RATIO) can be a linear or non-linear function of the relative amount of chroma in the initial CMY data, and is equal to 0 for gray colors and is equal to 1 for data without a gray component.

Figures 5, 6:
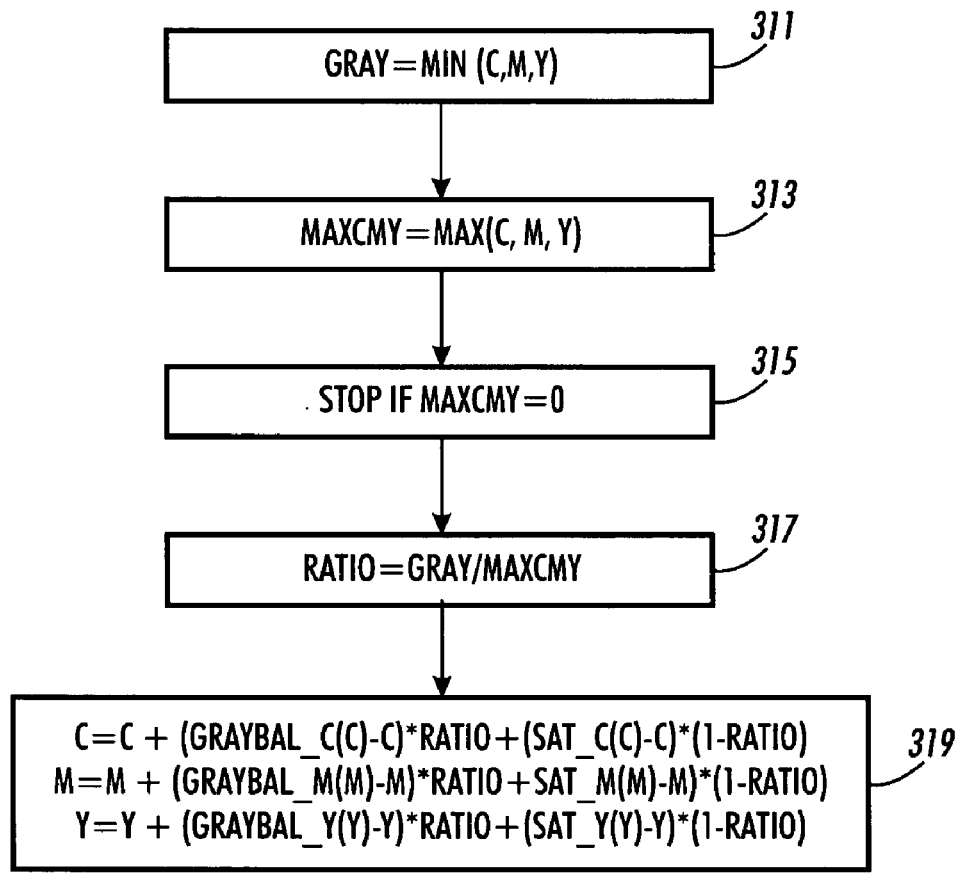
FIG. 5 is a simplification of equations of a step of the procedure of FIG. 4.
FIG. 6 is a schematic flow diagram of an embodiment of a gray balance adjustment and color saturation adjustment procedure.

The equations in 219 of FIG. 4 can be simplified to the equations in 219' of FIG. 5 wherein each of the saturation adjusted CMY data values is the sum of (1) the product of the initial C, M, or Y data value and RATIO, and (2) the product of the corresponding maximum saturation adjusted value SAT_C(C), SAT_M(M) or SAT_Y(Y) and (1-RATIO). In this manner, color saturation adjustment can be considered as the sum of a portion of the initial color data value and a portion of the corresponding maximum saturation adjusted value, wherein the portion of the initial color data value is a function of the relative amount of gray and wherein the portion of the corresponding maximum saturation adjusted value is a function of the relative amount of chroma in the initial CMY data values.

FIG. 6 is a schematic flow diagram of an embodiment of a procedure for gray balancing and color saturation adjusting non-gray balanced non-black primary color data such as CMY data for a pixel of an image, and can be employed to gray balance and color saturation adjust some or all of the pixels of an image, as desired.

At 311 a GRAY component is set to the minimum of the initial or input C, M and Y data values for a pixel. At 313 MAXCMY is set to the maximum of the initial C, M and Y data values for a pixel. At 315 the procedure is stopped if the maximum MAXCMY of the initial C, M and Y values is zero (i.e., if all of the initial C, M and Y values are zero), and the CMY data values for this pixel are not adjusted. At 317 a RATIO of the GRAY component to MAXCMY is calculated. At 319 gray balanced and saturation adjusted output CMY data values are calculated by adding to each of the initial CMY values (A) a product of: (1) the difference between the corresponding maximum gray balance adjusted value GRAY-BAL_C(C), GRAYBAL_M(M) or GRAYBAL_Y(Y), and the initial C, M or Y value, and (2) the RATIO calculated previously, and (B) a product of: (1) the difference between the corresponding maximum saturation adjusted value SAT_C(C), SAT_M(M) or SAT_Y(Y), and the initial C, M or Y value, and (2) one minus the RATIO calculated previously.

Figures 7, 8:
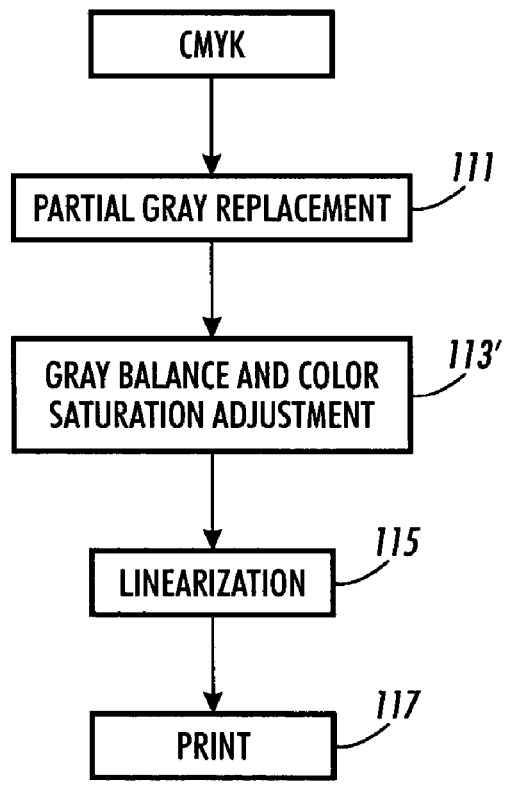
FIG. 7 is a simplification of equations of a step of the procedure of FIG. 6.
FIG. 8 is a schematic diagram of an embodiment of an image processing pipeline that employs the procedure of FIG. 6.

The equations in 319 of FIG. 6 can be simplified to the equations in 319' of FIG. 7 wherein each of the gray balanced and saturation adjusted CMY data values is the sum of (1) the product of the corresponding maximum gray balance adjusted value GRAYBAL_C(C), GRAYBAL_M(M) or GRAYBAL_Y(Y), and RATIO, and (2) the product of a corresponding maximum saturation adjusted value SAT_C(C), SAT_M(M) or SAT_Y(Y) and (1-RATIO).

In the procedure of FIG. 6, gray balancing and color saturation adjusting are performed on data that has not been gray balanced, for example, and for each of the C, M and Y colors, a portion of the corresponding maximum gray balance adjusted value GRAYBAL_C(C), GRAYBAL_M(M) or GRAYBAL_Y(Y) is added to a portion of the corresponding maximum saturation adjusted value SAT_C(C), SAT_M(M) or SAT_Y(Y) and (1-RATIO). The procedure of FIG. 6 combines the functions of gray balancing and color saturation adjustment, and can be employed in an embodiment of a portion of an image processing pipeline as set forth in FIG. 8 wherein gray balancing and color saturation adjustment are performed at 113'.

In the procedure of FIG. 6, since RATIO is GRAY/MAXCMY, RATIO can be considered as defining the relative amount of gray in the initial CMY data values. (1-RATIO) can be expressed as (MAXCMY−GRAY)/MAXCMY, and thus can be considered as defining the relative amount of chroma or non-gray in the original CMY data values. (MAXCMY−GRAY) can be considered as a chroma component of the initial CMY data values. RATIO can also be conveniently considered as a relative gray component while (1-RATIO) can be conveniently considered as a relative non-gray or chroma component.

Since RATIO increases with the relative amount of gray in the initial CMY data values, the amount of gray balancing that is performed in the procedure of FIG. 5 increases with the relative amount of gray that is contained in the initial CMY data. In particular, the portions of the maximum gray balance adjusted values that contribute to the gray balanced and color saturation adjusted CMY data values are functions of the relative gray component RATIO. In this manner, the amount of gray balancing is a function of the relative amount of gray in the initial CMY data, and less gray results in less gray balancing while more gray results in more gray balancing. Thus, if the initial values of C, M and Y are all non-zero and equal (i.e., gray), RATIO is 1 and full gray balancing is performed. If at least one of the original values of C, M and Y is zero (i.e., the gray component is zero), RATIO is zero and no gray balancing is performed.

Since (1-RATIO) increases with the relative amount of chroma in the initial CMY data, the amount of saturation adjustment increases with the relative amount of chroma that is contained in the initial CMY data. In particular, the portions of the maximum color saturation adjusted values that contribute to the gray balanced and saturation adjusted CMY data values are functions of the relative chroma component (1−RATIO). In other words, the amount of saturation adjustment is a function of the relative amount of chroma (1−RATIO) in the CMY data, and more chroma results in more saturation adjustment while less chroma results in less saturation adjustment. Thus, for data without a gray component (i.e., at least one of the initial C, M and Y values is zero), RATIO is equal to zero, (1-RATIO) is 1, and maximum saturation adjustment is performed. For gray colors (i.e., the non-initial C, M and Y values are equal), RATIO is 1, (1-RATIO) is zero, and no saturation adjustment is performed.

More generally, the amount of gray balancing can be a linear or non-linear function of the relative amount of gray, while the amount of saturation adjustment can be a linear or non-linear function of the relative amount of chroma in the initial CMY data. For example, RATIO can be a linear or non-linear function of the relative amount of gray in the initial CMY data, and is equal to 1 for gray colors and is equal to 0 for data without a gray component. Similarly, (1-RATIO) can be a linear or non-linear function of the relative amount of chroma in the initial CMY data, and is equal to 0 for gray colors and is equal to 1 for data without a gray component.

The maximum saturation adjusted values SAT_C(C), SAT_M(M) and SAT_Y(Y) can be obtained from saturation curves that can be implemented as a look-up table that is indexed by the C, M and Y data values, for example. The color saturation curves can be sigmoid functions as discussed previously relative to the procedure of FIG. 4.

Referring again to the equations at 319' of FIG. 7, color saturation adjustment can be considered as the sum of a portion of the corresponding maximum gray balance adjusted value and a portion of the corresponding maximum saturation adjusted value, wherein the portion of the maximum gray balance adjusted value is a function of the relative amount of gray in the initial CMY data values, and wherein the portion of the corresponding maximum saturation adjusted value is a function of the relative amount of chroma in the initial CMY data values. In this manner, the gray balanced and saturation adjusted data value comprises the sum of a gray balanced component and a saturation adjusted component.

The maximum gray balance adjusted values GRAYBAL_C(C), GRAYBAL_M(M) and GRAYBAL_Y(Y) are obtained from gray balancing curves that can be implemented as a look-up table that is indexed by the initial CMY values, for example. The gray balancing curves can be arrived at empirically by printing a plurality of color samples or patches, and then selecting gray patches from the printed color patches, for example by initial visual sorting and then electro-optical measurement. A curve fitting procedure is then performed on the CMY values of the selected gray patches to approximate the ink combinations needed to obtain grays of different densities.

The gray balancing curves can also be arrived at empirically by printing a plurality of color patches or samples that encompass predetermined gray targets, and measuring the color of the color samples to obtain their colorimetric values. The color samples can include non-neutral colors, and preferably define a volume that surrounds or encompasses the predetermined gray targets. The CMY values of the color samples are then interpolated in a color space such as L*a*b, for example using tetrahedral interpolation, to determine discrete CMY combinations that substantially match the predetermined gray targets. Curve fitting can then be performed on the discrete CMY combinations to arrive at the gray balancing curves.

Tetrahedral interpolation can be accomplished for example by employing Delauney tessellation to tessellate the space covered by the color sample calorimetric data values. Delauney tessellation fills that space with non-overlapping tetrahedra. To obtain the CMY combinations that produces a targeted gray (expressed for example in L*a*b values), the tetrahedron that encompasses the gray target is first located, and barycentric weights are calculated and applied to the four vertices of the tetrahedron to obtain the CMY values for the gray target. For tetrahedral interpolation, the color samples can be selected such that the predetermined gray targets are encompassed by the space defined by the tetrahedra employed for tetrahedral interpolation.

The predetermined gray targets can comprise colors with a*=0 and b*=0, or they can be colors that substantially match the colorimetric values of different amounts of black, for example.

By way of illustrative example, the following c code can be employed to generate color samples that encompass gray targets that can comprise for example colors with a*=0 and b*=0:

```
for(c = 0.0; c < 1.0; c+=0.07) {
    for(m = 0.0; m < 1.0; m+=0.07) {
        for(y = 0.0; y < 1.0; y+=0.07) {
            gray = min(c, min(m,y));
            if(c - gray < 0.15 && m - gray < 0.15 && y -
```

-continued

```
            gray < 0.15)
                printf("%2.4f %2.4f %2.4f %2.4f\n",
                    c, m, y, 0.0);
        }
    }
}
```

The foregoing loops through CMY combinations in 7% steps and finds those color values that are within 15% (in absolute terms) of the gray component which is the minimum of the C, M and Y values of each CMY combination. Min(x, y) is macro that returns the minimum of x and y, and thus min(c, min(m,y)) gives the minimum of C, M and Y. This code generates CMY data values for printing 255 color samples around and on an axis defined by the gray components. Stated another way, the procedure prints only color samples that are within a selected percentage of selected colors having equal amounts of C, M and Y. It should be appreciated that other distances from colors of equal amounts of C, M and Y can be employed, for example to insure that the printed color samples encompass the predetermined gray targets. By way of specific examples, color values within 10% or 20% of the colors having equal amounts C, M and Y can be printed. It should also be appreciated that the step size can be selected pursuant to various considerations including for example the desired accuracy and/or the desired number of samples. The printed color samples are then measured to produce colorimetric data which can be used to tetrahedrally interpolate the CMY data values to determine discrete CMY combinations that substantially match a range of neutral targets. Curve fitting can then be performed on the discrete CMY combinations to arrive at the gray balancing curves.

The gray balancing curves can be configured to track the density characteristic of the black ink used by the printer, for example.

The invention has been described with reference to disclosed embodiments, and it will be appreciated that variations and modifications can be affected within the spirit and scope of the invention.

What is claimed is:

1. A method of gray balance adjustment and color saturation adjustment comprising:

determining a relative amount of gray in initial CMY data values;

determining a relative amount of chroma in the initial CMY data values; and for each of the initial CMY data values, adding a portion of a corresponding maximum gray balance adjusted value and a portion of a corresponding maximum color saturation adjusted value to produce respective gray balance adjusted and color saturation adjusted CMY data values; and wherein the portion of a corresponding maximum gray balance adjusted value is a function of the relative amount of gray and the portion of the maximum saturation adjusted value is a function of the relative amount of chroma, wherein:

determining a relative amount of gray comprises determining a relative amount of gray using:

RATIO=MIN(*C, M, Y*)/MAX(*C, M, Y*)

wherein MIN(C, M, Y) is a minimum of the initial CMY data values and MAX(C, M, Y) is a maximum of the initial CMY data values;

determining a relative amount of chroma comprises calculating (1-RATIO); and adding a portion of a corresponding maximum gray balance adjusted value and a portion of a corresponding maximum color saturation adjusted value to produce respective gray balance adjusted and color saturation adjusted CMY data values comprises:

$$C = \text{GRAYBAL } C(C) * \text{RATIO} + \text{SAT } C(C) * (1-\text{RATIO})$$

$$M = \text{GRAYBAL } M(M) * \text{RATIO} + \text{SAT } M(M) * (1-\text{RATIO})$$

$$C = \text{GRAYBAL } Y(Y) * \text{RATIO} + \text{SAT } Y(Y) * (-1-\text{RATIO})$$

wherein GRAYBAL C(C), GRAYBAL M(M) and GRAYBAL Y(Y) are maximum gray balance adjusted values, and SAT C(C), SAT M(M) and SAT Y(Y) are maximum color saturation adjusted values.

2. The method of claim 1 wherein determining a relative amount of gray comprises calculating a ratio between a minimum of the initial CMY data values and a maximum of the initial CMY data values.

3. The method of claim 1 wherein determining a relative amount of chroma comprises calculating (1-RATIO) wherein RATIO is a ratio between a minimum of the initial CMY data values and a maximum of the initial CMY data values.

4. A method of gray balance adjustment and color saturation adjustment, comprising:

generating respective gray balancing components for initial CMY data values;

determining a relative amount of chroma in the initial CMY data values;

generating respective color saturation adjustment components for the initial CMY data values; and adding respective gray balancing components and respective color saturation adjustment components to produce respective gray balanced and color saturation adjusted CMY data values, wherein generating respective gray balancing components comprises calculating:

GRAYBAL C(C)*RATIO

GRAYBAL M(M)*RATIO

GRAYBAL Y(Y)*RATIO wherein GRAYBAL C(C), GRAYBAL M(M) and GRAYBAL Y(Y) are maximum gray balance adjusted values, and RATIO is a ratio between a minimum of the initial CMY data values, and a maximum of the initial CMY data values.

5. The method of claim 4 wherein:

each gray balancing component comprises a portion of a corresponding maximum gray balance adjusted value, wherein such portion of a corresponding maximum gray balance adjusted value is a function of a relative amount of gray in the initial CMY data values; and each color saturation adjustment component comprises a portion of a corresponding maximum color saturation adjusted value, wherein such portion of a corresponding maximum color saturation adjusted value is a function of a relative amount of chroma in the initial CMY data values.

6. A method of gray balance adjustment and color saturation adjustment, comprising:

generating respective gray balancing components for initial CMY data values;

determining a relative amount of chroma in the initial CMY data values;

generating respective color saturation adjustment components for the initial CMY data values; and adding respective gray balancing components and respective color saturation adjustment components to produce respective gray balanced and color saturation adjusted CMY data values, wherein generating respective color saturation adjustment components comprises calculating:

SAT_C(C)*(1-RATIO)

SAT_M(M)*(1-RATIO)

SAT_Y(Y)*(1-RATIO)

wherein SAT_(C), SAT_M(M) and SAT_Y(Y) are maximum color saturation adjusted values, RATIO is a ratio between a minimum of the initial CMY data values and a maximum of the initial CMY data values.

* * * * *